US008427938B2

(12) United States Patent
Atreya et al.

(10) Patent No.: US 8,427,938 B2
(45) Date of Patent: Apr. 23, 2013

(54) VIRTUAL LOCAL AREA NETWORK SERVER REDUNDANCY AND FAILOVER TO ENABLE SEAMLESS MOBILITY IN THE MOBILITY DOMAIN

(75) Inventors: Vivek Atreya, Karnataka (IN); Shashi Ankaiah, Karnataka (IN); Seemant Choudhary, Fremont, CA (US); Kumara Das Karunakaran, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 418 days.

(21) Appl. No.: 12/772,424

(22) Filed: May 3, 2010

(65) Prior Publication Data
US 2010/0293043 A1 Nov. 18, 2010

Related U.S. Application Data

(60) Provisional application No. 61/178,276, filed on May 14, 2009.

(51) Int. Cl.
*H04L 1/00* (2006.01)
*H04W 4/00* (2009.01)

(52) U.S. Cl.
USPC .................................. 370/217; 370/338

(58) Field of Classification Search .................. None
See application file for complete search history.

(56) References Cited

U.S. PATENT DOCUMENTS 7,739,398 B1* 6/2010 Shabtay ...................... 709/232
2007/0110077 A1* 5/2007 Takashige et al. ....... 370/395.53

* cited by examiner

*Primary Examiner* — Clemence Han
(74) *Attorney, Agent, or Firm* — Anderson Gorecki & Rouille LLP (57) ABSTRACT

A method, apparatus and computer program product for providing Virtual Local Area Network (VLAN) server redundancy is presented. A mobility switch (MS) advertises to at least one peer mobility switch, VLANs configured as server capable, the advertising including providing priority information relating to a server for the VLAN. The MS receives advertising from the at least one peer mobility switch and elects a server for a mobility VLAN which is not mapped locally. The MS maintains a current server and a list of alternative servers for the VLAN and determines when the MS looses connection with the current server for the VLAN and moves the VLAN to an alternate server contained on the list.

20 Claims, 5 Drawing Sheets

VIRTUAL LOCAL AREA NETWORK SERVER REDUNDANCY AND FAILOVER TO ENABLE SEAMLESS MOBILITY IN THE MOBILITY DOMAIN

CROSS REFERENCE TO RELATED APPLICATIONS

The present application claims the benefit of U.S. Provisional Patent Application No. 61/178,276, filed on May 14, 2009, which is incorporated herein by reference in its entirety.

BACKGROUND

Wireless networks have become ubiquitous. A wireless network refers to any type of computer network that is wireless, and is commonly associated with a telecommunications network whose interconnections between nodes is implemented without the use of wires.

A typical Wireless Local Area Network (WLAN) includes a Wireless Controller (WC), one or more Access Points (APs), one or more Mobility Switches (MSs) and one or more Mobility Units (MUs). A Mobility Domain (MD) is a single geographic area where a same set of mobility services are provided. A mobility domain can include tens of Wireless controllers, hundreds of MSs, thousands of APs, and tens of thousands of MUs. MUs can include laptops, cell phones, Personal Digital Assistants (PDAs) and the like.

A wireless AP is a device that allows wireless communication devices to connect to a wireless network. The mobility switches allow mobility units (e.g. laptops, cell phones etc.) to roam among various locations and still have network access. The mobile unit includes a wireless transceiver which can communicate with an access point. The communication can occur via radio waves, infrared, or any other known form of wireless communication. The access point allows wireless mobile units to communicate with each other and to communicate with infrastructure connected to the access point.

Wireless Local Area Networks (LANs) are a popular and inexpensive way to allow multiple users of "mobile units" (MUs) to communicate with each other, to access a wired LAN, to access a local server, to access a remote server, such as over the Internet, etc. A wireless local area network (WLAN) typically includes an Access Point (AP) and one or more mobile units. A wireless local area network may also include one or more Virtual Local Area Networks (VLANs). A VLAN includes a group of devices with a common set of requirements that communicate as if they were attached to the same broadcast domain, regardless of their physical location. A VLAN has the same attributes as a physical LAN, but allows for devices to be grouped together even if they are not located on the same network switch.

The server can provide services, such as access to applications like an email system, a word processing program, an accounting system and/or a dedicated database. Wireless LANs are employed within such facilities as businesses, university classrooms or buildings, airport lounges, hotel meeting rooms, etc. When a user is physically located in the vicinity of an access point, the transceiver of the mobile unit communicates with the access point and a connection to the wireless LAN is established.

APs and mobile units transmit data in units referred to as frames over a shared-communications channel. Frames transmitted from a mobile unit to an AP are referred to as uplink frames, and frames transmitted from an AP to a mobile unit are referred to as downlink frames. In a situation where two or more mobile units (or an AP and a mobile unit) transmit frames simultaneously, then one or more of the frames can become corrupted, referred to as a collision. As a result, Wireless Local Area Networks (WLANs) typically employ one or more protocols to ensure that a mobile unit or AP can gain exclusive access to the shared-communications channel for a predetermined interval of time in order to transmit its frames without collisions occurring.

Certain wireless network protocols (e.g., Institute of Electrical and Electronics Engineers [IEEE] 802.11, etc.) provide for the AP to periodically broadcast a special frame called a beacon that can be heard by the mobile units in the BSA (basic service area), the area covered by the AP. The beacon contains a variety of information that enables the mobile units to establish and maintain communications in an orderly fashion, such as a timestamp, which enables mobile units to synchronize their local clocks, and signaling information (e.g., channel number, frequency hopping pattern, dwell time, etc.).

SUMMARY

Conventional mechanisms for providing seamless connectivity for roaming Mobile Units suffer from a variety of deficiencies. One such deficiency is that in a Mobility Domain, when the designated server for a VLAN or the path to the server goes down, it brings down the ability to provide seamless data connectivity for roaming Mobile Units.

If a particular VLAN (or set of VLANS) are being served by a single server, the load on that particular server goes up when a large number of mobile units roam. This affects the switching data path performance at the server, resulting in degraded performance for roaming mobile units. Delays and/or packet drops introduced due to this have a detrimental effect on delay sensitive applications such as voice.

Embodiments of the invention significantly overcome such deficiencies and provide mechanisms and techniques that provide VLAN server redundancy and failover to enable seamless mobility in the mobility domain.

In a particular embodiment of a method for providing VLAN server redundancy and failover, the method includes advertising, by an MS to at least one peer mobility switch, VLANs configured as server capable, the advertising includes priority information relating to a server for the VLAN. The method further includes the MS receiving advertising from the at least one peer mobility switch, and the MS electing a server for a mobility VLAN and maintaining this information in Vlan Server Table. Mobility VLAN which is not mapped locally will use this table to elect Vlan Server. Additionally, the method includes maintaining a current server and a list of alternative servers for the VLAN at the MS, determining when the MS looses connection with the current server for the VLAN and moving the VLAN to an alternate server contained on the list.

Other embodiments include a computer readable medium having computer readable code thereon for providing VLAN server redundancy and failover. The computer readable medium includes instructions for advertising, by a MS to at least one peer mobility switch, VLANs configured as server capable, the advertising includes priority information relating to a server for the VLAN. The computer readable medium further includes instructions for the MS receiving advertising from the at least one peer mobility switch, and instructions for the MS electing a server for a mobility VLAN which is not mapped locally. Additionally, the computer readable medium includes instructions for maintaining a current server and a list of alternative servers for the VLAN, instructions for determining when the MS looses connection with the current server for the VLAN and instructions for moving the VLAN to an alternate server contained on the list.

Still other embodiments include a computerized device (e.g., a Mobility Switch), configured to process all the method operations disclosed herein as embodiments of the invention. In such embodiments, the computerized device includes a memory system, a processor, communications interface in an interconnection mechanism connecting these components. The memory system is encoded with a process that provides VLAN server redundancy and failover as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing VLAN server redundancy and failover as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The presently described method and apparatus for providing Virtual Local Area Network (VLAN) server redundancy and failover provides a mechanism to enhance the reliability and performance of mobility paths in a unified network, as well as allowing for seamless roaming of a mobility unit within the mobility domain.

Figure 1:
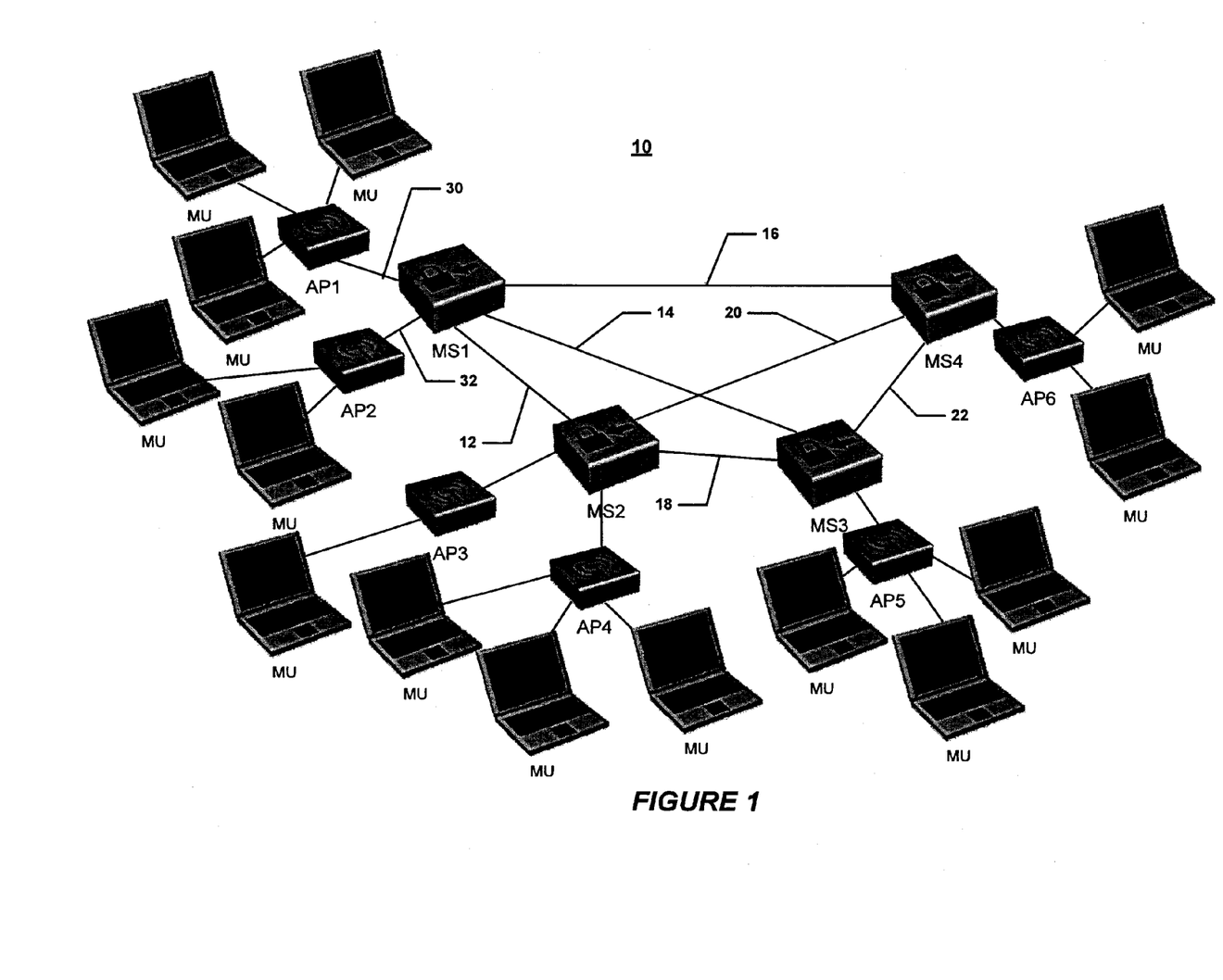
FIG. 1 depicts a block diagram view of an example mobility domain.

Referring to FIG. 1, a Mobility Domain (MD) 10 is shown. In this example, the MD 10 includes four mobility switches MS1, MS2, MS3 and MS4, though it should be recognized that typical environments can include hundreds of MSs. The MSs are interconnected in a mesh arrangement by a plurality of mobility tunnels. Mobility tunnel 12 is provided between MS1 and MS2, mobility tunnel 14 is provided between MS1 and MS3 and mobility tunnel 16 is provided between MS1 and MS4. Mobility tunnel 18 is provided between MS2 and MS3, mobility tunnel 20 is provided between MS2 and MS4 and mobility tunnel 22 is provided between MS3 and MS4.

Mobility domain 10 also includes six APs. An access tunnel is provided between a respective AP and an MS. Access tunnel 30 is provided between AP1 and MS1 and access tunnel 32 is provided between AP2 and MS1. Access tunnel 34 is provided between AP3 and MS2 and access tunnel 36 is provided between AP4 and MS2. Access tunnel 38 is provided between AP5 and MS3 and access tunnel 40 is provided between AP6 and MS4.

Various protocols are used in the data plane of the mobility domain 10. The protocols in the data plane can be broadly classified into two categories: Tunnel Protocols, and the Mobility VLAN Management Protocol (MVMP). The tunnel protocols are used to setup, maintain, and teardown tunnels in the data plane. The tunnel protocols offer control and data packet transfer services to other layers in the system. The MVMP runs over the control channel offered by the tunnel protocol and provides VLAN management services on the Access and Mobility tunnels.

The Access Tunnel Protocol (ATP) is used to setup, and manage the Access Tunnel (between the AP and the MS). An ATP client resides on the Access Point and the ATP server on the Mobility Switch.

The Mobility Tunnel Protocol (MTP) is used to setup, and manage the Mobility Tunnel (between peer MSs in the mobility domain). The MTP components (client and server) reside on the Mobility Switches. The MVMP specifies the protocols for wireless switches to advertise the mobility VLANs they support and for peer switches to elect VLAN servers. The MVMP components run on Access Points and Wireless Switches.

Also shown are a plurality of mobile Units (MUs). Examples of MUs include laptop computers, cellular telephones, Personal Digital Assistants (PDAs) and the like. The MD architecture supports roaming of Mobile Units across Mobility Switches. The MUs retain their IP Address in both intra-subnet and inter-subnet roaming scenarios. The MUs also retain their membership to the mobility VLAN they have been assigned, even during roaming scenarios.

Mobility Vlan is identified by a unique name in the MD. Each MU is assigned a mobility VLAN, the scope of the VLAN being valid in the MD. The mobility VLAN is mapped to a local (static) VLAN on mobility switches. When a MU roams to a switch on which a local mapping (association) for the mobility VLAN is not available, the packets need to be tunneled to its VLAN server. This implies that the mobility switches in a MD need to be aware of the availability of VLAN servers for the various VLANs in the domain.

The Mobility VLAN Management Protocol (MVMP) suite provides a framework for wireless switches to advertise the VLANs they support to their peers in the mobility domain and also their capability to act as VLAN servers for those VLANs. The protocol supports the VLAN membership management capabilities which allows APs and peer MSs to request MS(s) to add VLANs to the tunnels they share.

The Mobility Agent (MA) is a lightweight component in the MS. MA communicates with the Mobility Controller using Control and Provisioning of Wireless Access Points (CAPWAP) like interface. Mobility Agent communicates with other MA's and AP's using Data Plane protocols. An MA identifies an MS by the base Media Access Control (MAC) address i.e., MSID. Access and Mobility tunnels terminate on this MSID.

Multiple Mobility Switches (MS) in the mobility domain provide connectivity to a VLAN. Such VLAN(s) are configured as server capable. MS(s) periodically advertise the VLAN(s) which are configured as server capable. The advertisements includes administrator-configured priority, dynamic priority (computed from switch current capacity and the port information) and the location information of the server.

Peer MS(s) receive the advertisements and elect VLAN servers for a Mobility VLAN which is not mapped locally. MS(s) use the advertised priority to elect a server for a VLAN.

A random weighted election method is used to load balance when more than one server advertise for a VLAN. In this method, a probability density function is computed from current advertised priority. The base MAC address is used as the seed for the random number generator. This ensures that on an average the highest priority switch gets most remote VLAN connections yet achieve load balancing.

Peer MS(s) maintains the current server and the list of alternative servers for a VLAN. When a mobility switch looses its connection with the current VLAN server, it moves the VLANS to the alternative server. This enhances reliability and allows MUs to roam seamlessly within a mobility domain and maintain membership within the original VLAN.

Initially, the mobility switch/mobility agent initializes. The mobility switch establishes tunnels (mobility tunnels) with the peer mobility switches, and then the MS advertises VLAN (s) which are configured as server capable on those switches. Peer MS(s) records this information. Based on those advertisements, the MS builds a VLAN Server Table (VST) in that mobility switch, such that each switch knows which peer has access to which VLANs. The mobility tunnels are maintained using keep alive packets. These are periodic packets which are sent across this tunnel.

When a mobile unit associates to an access point, using an associate message, the access point will talk directly to the wireless controller to authenticate this particular client. A specific protocol is used to authenticate the client and at the same time establish his authorizations. The mobility VLAN ID (MVID) is a map of the mobility VLAN name to a unique ID on this side of the domain. The configured VLAN names are mapped to VLAN IDs in the address space. This can use a standard VLAN address space. The VLAN address space is used to map a VLAN name to a VLAN number, and this number is passed back to the access point.

Access point sends add VLAN request to the MS if the Access Tunnel to the MS is not part of the Mobility Vlan. Access point also sends the Mobility VLAN ID of the Mobile Unit in the VLAN Add Request. This is accomplished using VLAN Membership Management (VMM) message. Based on the service provided by the mobility vlan, the MS either processes the request locally (if mobility vlan is mapped to a local vlan) or ask vlan server to process the request. In this particular example, the MS determines that a particular VLAN is not mapped locally and is available on a peer mobility switch. The MS will look up the VLAN server for the Mobility Vlan and sends the add VLAN request to the Vlan Server. The Vlan Server will add the tunnel (through which the request came) to that Mobility VLAN which is mapped locally. The MS will add a membership by modifying the VLAN membership table. The Vlan Server responds with a Vlan Membership Response message saying that the VLAN is added. At this point the mobility switch creates a remote VLAN, which is a temporary VLAN created dynamically by the mobility switch, and connects the access tunnel and the mobility tunnel to that temporary VLAN, and sends a Vlan Membership response to Access Point. This happens only once per VLAN. When another mobile user comes to the same VLAN on the access point, the reference count is incremented at the access point and not propagated to the switches, so becomes a local operation and VLAN memberships are managed at the access point.

The point of associations to the point at which a client can actually start sending traffic exploits in about 50 ms. Once memberships are established on the Mobility Tunnel, the client MS will send learning frames on the Mobility Tunnel to Vlan Server. The frames are sent for every roaming MU(s). These are Ethernet SNAP packets with SNAP OUID set to Avaya OUID. The source MAC is the roaming MU MAC and the destination MAC is either failed MS MAC or broadcast MAC. It tells the rest of the switches in the designated network (i.e., the network where mobility vlan is mapped to local vlan) that this particular client Mac address is available on those VLAN ports, on special ports, or on physical ports. This is required for outbound traffic i.e., traffic which is destined for the roaming MU(s). Sending learning frames will help the switches in the designated network to mark the movement of roaming MU(s) address. Finally, data packets are exchanged between the client and the corresponding node.

Figure 2:
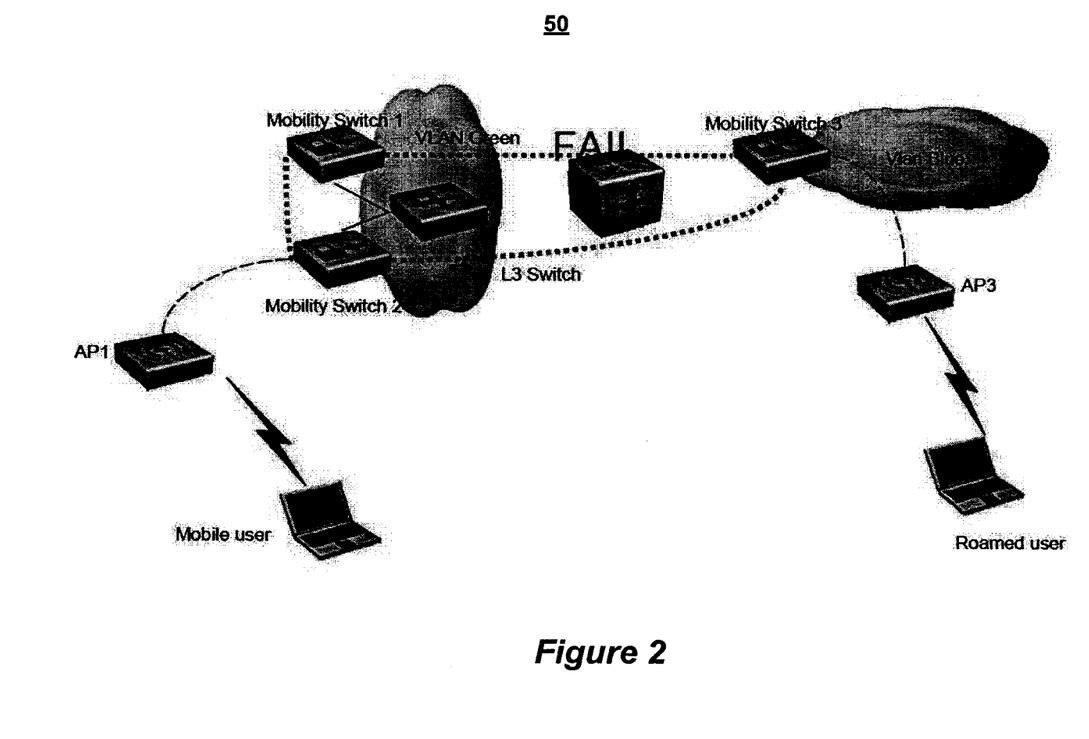
FIG. 2 depicts a block diagram illustrating the use of learning frames after VLAN Server Switchover/Failover.

VLAN server switch failover and the use of learning frames as part of the recovery will now be described with respect to the mobility domain 50 shown in FIG. 2. A first MS (MS1) and a second MS (MS2) provide connectivity in the first VLAN and use wired connectivity for the MU traffic in the first VLAN (VLAN Green). An MU roams to a third MS (MS3) in a second VLAN (VLAN Blue) in a second network. The third MS does not provide connectivity in the first VLAN.

The third MS chooses the first MS as the VLAN server for first VLAN and the second MS as the alternate server for first VLAN. The third MS forwards the first VLAN traffic to the first MS over the mobility Tunnel (MT). The Source MAC Address of roaming MU(s) will be learned at the third MS on the access tunnel and at the first MS on the mobility tunnel between first MS and third MS.

The wired switches in the first VLAN will learn the source MAC address of the roamed MU(s) such that traffic sent to the roamed MU by devices in first VLAN will be forwarded to the first MS, which will then send it over the mobility tunnel to the third MS which then forwards it to the associated AP.

The VLAN server can switchover/failover from the first MS to the second MS when the advertised priority of the VLAN servers change. This could happen if first MS looses access to the first VLAN due to failure of next hop switch(es) in the first VLAN or some other metric used to measure the health of the connectivity with the first VLAN at first MS. This could also occur when the weight of the first MS is lowered explicitly compared to the second MS by the administrator or if the first MS leaves the mobility domain due to administrator action.

In the event of a switchover/failover of the VLAN server from the first MS to the second MS it is required that wired switches in the first VLAN relearn the source MAC address of the roamed MU such that the traffic sent to roamed client is now forwarded to the second MS instead of the first MS; and the second MS learns the MAC address of the roamed client on the mobility tunnel between the second MS and the third MS. Till second MS learns the roamed client MAC address, the communication from the clients in the first VLAN to the roamed client will be broken.

In order to force the switches in the first VLAN to re-learn the source MAC address of the roamed clients such that traffic gets forwarded over the MT between the second MS and the third MS, the third MS sends MAC address learning frames in the first VLAN over the MT between the third MS and the second MS. The destination MAC address is the MAC address of the failed switch first MS or broadcast MAC. The learning frame is sent for every known roamed MU on the third MS in the first VLAN.

As soon as the first VLAN server switchover/failover from the first MS to the third MS, the third MS sends the learning frames on behalf of each known roamed client at the third MS and the connection between clients in the first VLAN, and the known roamed clients on the third MS is re-established via the second MS.

The learning frame uses LLC/SNAP encapsulation with proprietary OUI's and protocol values. This is done so that end nodes that may receive the learning frames can drop these frames earlier in their packet processing pipelines avoiding significant negative impact on their performance or behavior. The benefit of this technique is reduced packet loss when the communication is unidirectional from devices in the first VLAN (for example media servers) and roamed clients (media clients).

Using destination MAC as the MAC address of the failed VLAN server instead of broadcast frame prevents unnecessary flooding in the first VLAN when the MAC address of the first MS is known to wired switches in the first VLAN. However, a scheme that uses destination MAC as broadcast MAC would also work. Using a proprietary LLC/SNAP header minimizes the negative impact of the learning frames on other devices in the first VLAN.

Figure 3:
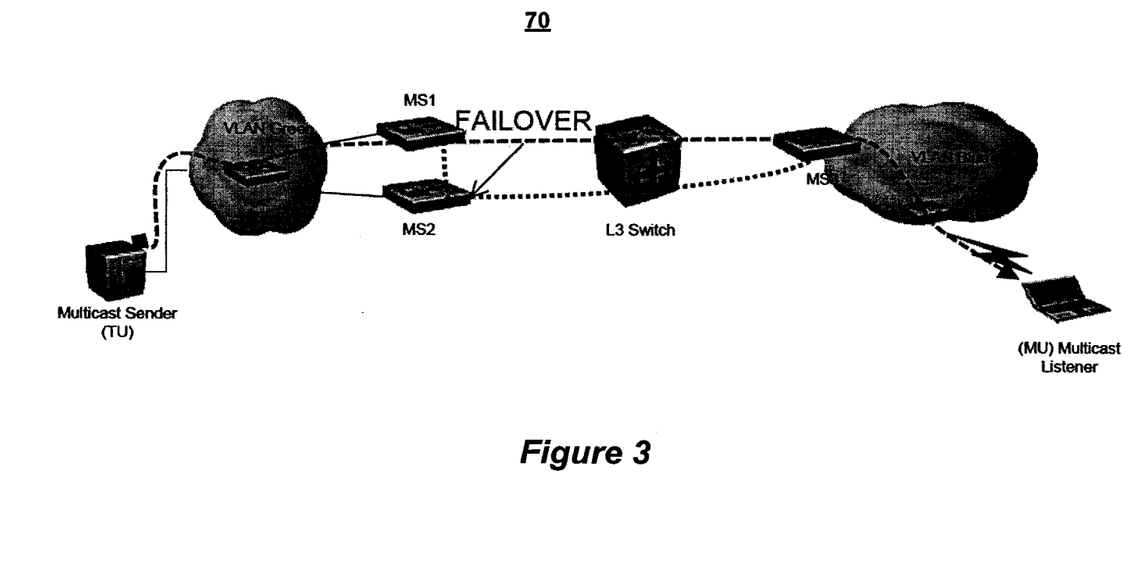
FIG. 3 depicts a block diagram illustrating the use of multicast recovery after VLAN server failover.

Referring now to FIG. 3, regarding VLAN server failover for Multicast recovery, an environment 70 is shown wherein a first MS (MS1) and second MS (MS2) provide direct wired connectivity in first VLAN (VLAN Green) is used as an example. An MU roams from a first MS to a third MS (MS3) i.e. second VLAN network (VLAN Blue). The third MS does not provide direct-wired connectivity in first VLAN.

The third MS chooses the first MS as the VLAN server for first VLAN based on advertised priorities. The second MS is chosen as the alternate server for first VLAN.

For multicast optimization Internet Group Management Protocol (IGMP) snooping can be enabled on switches in the first VLAN. IGMP snooping prevents flooding of multicast requests in the first VLAN, by forwarding traffic only on those ports that have a multicast listener. IGMP snooping is enabled per VLAN basis on a layer 2 switch. When a multicast listener sends an IGMP group join request a snooping switch learns group membership on the port on which the join request was received. When a multicast frame (destination MAC is a multicast MAC address) is received on a VLAN on which snooping is enabled, the packet is forwarded only to those ports which are members of the multicast group.

In this example a roamed MU in the first VLAN on a first AP is a multicast listener and multicast sender is in first VLAN. IGMP snooping is enabled on wired switches in first VLAN, first MS, second MS and third MS. When the MU sends a IGMP join request for multicast stream created by the multicast sender (TU), the third MS will learn the multicast group membership on the access tunnel to the AP, the first MS will learn the multicast membership on MT to third MS and wired switches in the first VLAN will learn the multicast membership on wired ports that forward the multicast traffic to first MS. Thus an end-to-end multicast path is established from the TU to MU based on the IGMP join requests. IGMP join requests are sent by the MU in response to IGMP group membership queries or when a user starts an application on the MU and starts listening on the a multicast stream. IGMP membership queries are sent periodically by the IGMP routers so the switches refresh the multicast group membership periodically and purge out the stale ones.

When first VLAN server failover happens while a roamed multicast listener is receiving a multicast stream from another device in the first VLAN, the multicast stream from the sender to the listener will be broken until the listener sends another IGMP join request. This could take a long time depending on timers configured on IGMP routers and proxy queriers. In order to enable a faster recovery of the stream in this scenario, the third MS sends a proxy query to all associated roaming clients in first VLAN or sends an IGMP join request on behalf of all roamed clients in first VLAN over the MT to the new first VLAN server (the third MS). In either case, the final effect is that an IGMP join request goes over the MT between third MS and second MS into the VLAN first and all switches (wired and mobility) that have IGMP snooping enabled on the first VLAN update the group membership such that the multicast traffic starts flowing via second MS over the MT to third MS. This will restore the multicast stream of all roamed clients on third MS in first VLAN faster than what the IGMP protocol timers can do.

Figure 4:
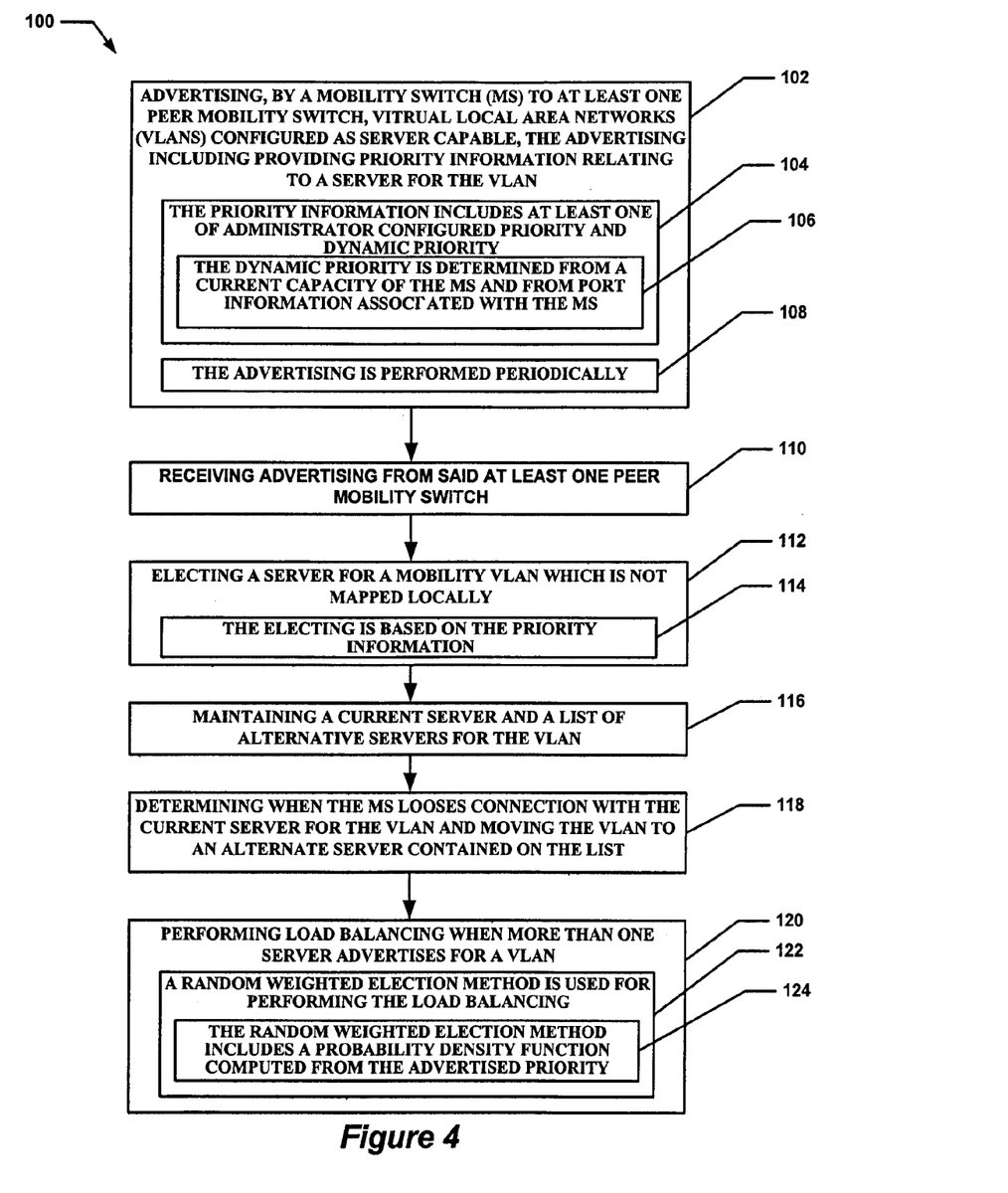
FIG. 4 depicts a flow diagram of a particular method of performing Virtual Local Area Network (VLAN) server redundancy and failover in accordance with embodiments of the invention.

A flow diagram of a particular embodiment of the presently disclosed method for VLAN server redundancy and failover is depicted in FIG. 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a particular embodiment of a method 100 of performing VLAN server redundancy and failover is shown. Method 100 begins with processing block 102 which discloses advertising, by a mobility switch (MS) to at least one peer mobility switch, Virtual Local Area Networks (VLANs) configured as server capable, the advertising including providing priority information relating to a server for the VLAN. Processing block 104 states the priority information includes at least one of administrator configured priority and dynamic priority. As further shown in processing block 106 the dynamic priority is determined from a current capacity of the MS and from port information associated with the MS. As further shown in processing block 108 the advertising is performed periodically.

Processing block 110 recites receiving advertising from the at least one peer mobility switch. Similar to the advertising sent by the MS to peer MSs, the MS also receives advertising from peer MSs.

Processing block 112 discloses electing a server for a mobility VLAN which is not mapped locally. As further disclosed in processing block 114 the electing is based on the priority information. The priority information is obtained from the advertising.

Processing block 116 states maintaining a current server and a list of alternative servers for the VLAN. The MS, having received advertising from peer MSs as well as sending out advertising to peer MSs, can build a VST containing the current server for a particular VLAN and alternate servers for the particular VLAN.

Processing block 118 recites determining when the MS loses connection with the current server for the VLAN and moving the VLAN to an alternate server contained on the list. For example, the server for a particular VLAN may become unavailable or a connection to the server for the VLAN may become lost.

Processing block 120 discloses performing load balancing when more than one server advertises for a VLAN. As shown in processing block 122 a random weighted election method is used for performing the load balancing. As further shown in processing block 124 the random weighted election method includes a probability density function computed from the advertised priority. This is done to prevent a particular MS from associating with too many APs and VLANs, such that the MS becomes a potential bottleneck for data traffic.

Figure 5:
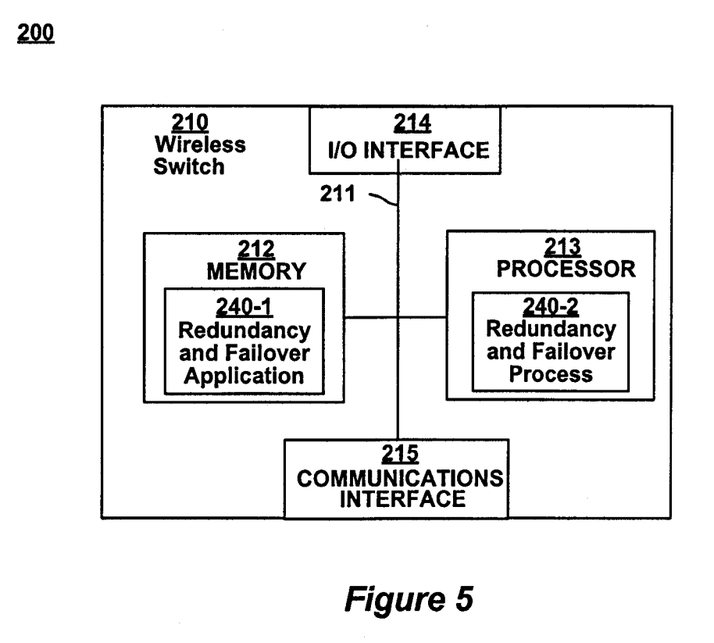
FIG. 5 illustrates an example computer system architecture for a computer system that performs Virtual Local Area Network (VLAN) server redundancy and failover in accordance with embodiments of the invention.

FIG. 5 is a block diagram illustrating example architecture of a wireless switch 210 that executes, runs, interprets, operates or otherwise performs a redundancy and failover application 240-1 and redundancy and failover process 240-2 suitable for use in explaining example configurations disclosed herein. As shown in this example, the wireless switch 210 includes an interconnection mechanism 211 such as a data bus or other circuitry that couples a memory system 212, a processor 213, an input/output interface 214, and a communications interface 215. The communications interface 215 enables the wireless switch 210 to communicate with other devices (i.e., other MSs and APs) on a network (not shown).

The memory system 212 is any type of computer readable medium, and in this example, is encoded with a redundancy and failover application 240-1 as explained herein. The redundancy and failover application 240-1 may be embodied as software code such as data and/or logic instructions (e.g., code stored in the memory or on another computer readable medium such as a removable disk) that supports processing functionality according to different embodiments described herein. During operation of the wireless switch 210, the processor 213 accesses the memory system 212 via the interconnect 211 in order to launch, run, execute, interpret or otherwise perform the logic instructions of a redundancy and failover application 240-1. Execution of a redundancy and failover application 240-1 in this manner produces processing functionality in the redundancy and failover process 240-2. In other words, the redundancy and failover process 240-2 represents one or more portions or runtime instances of a redundancy and failover application 240-1 (or the entire a redundancy and failover application 240-1) performing or executing within or upon the processor 213 in the computerized device 210 at runtime.

It is noted that example configurations disclosed herein include the redundancy and failover application 240-1 itself (i.e., in the form of un-executed or non-performing logic instructions and/or data). The redundancy and failover application 240-1 may be stored on a computer readable medium (such as a floppy disk), hard disk, electronic, magnetic, optical, or other computer readable medium. A redundancy and failover application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a redundancy and failover application 240-1 in the processor 213 as the redundancy and failover process 240-2. Those skilled in the art will understand that the wireless switch 210 may include other processes and/or software and hardware components, such as an operating system not shown in this example.

During operation, processor 213 of wireless switch 200 accesses memory system 212 via the interconnect 211 in order to launch, run, execute, interpret or otherwise perform the logic instructions of the redundancy and failover application 240-1. Execution of redundancy and failover application 240-1 produces processing functionality in redundancy and failover process 240-2. In other words, the redundancy and failover process 240-2 represents one or more portions of the redundancy and failover application 240-1 (or the entire application) performing within or upon the processor 213 in the wireless switch 200.

It should be noted that, in addition to the redundancy and failover process 240-2, embodiments herein include the redundancy and failover application 240-1 itself (i.e., the un-executed or non-performing logic instructions and/or data). The redundancy and failover application 240-1 can be stored on a computer readable medium such as a floppy disk, hard disk, or optical medium. The redundancy and failover application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of redundancy and failover application 240-1 in processor 213 as the redundancy and failover process 240-2. Those skilled in the art will understand that the wireless switch 200 can include other processes and/or software and hardware components, such as an operating system that controls allocation and use of hardware resources associated with the wireless switch 200.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
  advertising, by a first mobility switch (MS) to at least one peer mobility switch, Virtual Local Area Networks (VLANs) configured as server capable, said advertising including providing priority information relating to a server for said VLAN;
  receiving advertising from said at least one peer mobility switch;
  electing a server for a mobility VLAN which is not mapped locally;
  maintaining a current server and a list of alternative servers for said VLAN; and
  determining when said first MS loses connection with said current server for said VLAN and moving said VLAN to an alternate server contained on said list.

2. The method of claim 1 wherein said priority information includes at least one of administrator configured priority and dynamic priority.

3. The method of claim 2 wherein said dynamic priority is determined from a current capacity of said first MS and from port information associated with said first MS.

4. The method of claim 1 wherein said electing is based on said priority information.

5. The method of claim 1 further comprising performing load balancing when more than one server advertises for a VLAN.

6. The method of claim 5 wherein a random weighted election method is used for performing said load balancing.

7. The method of claim 6 wherein said random weighted election method includes a probability density function computed from said advertised priority.

8. The method of claim 1 wherein said advertising is performed periodically.

9. A first mobility switch (MS) comprising:
  a memory;
  a processor;
  a communications interface;

an interconnection mechanism coupling the memory, the processor and the communications interface; and wherein the memory is encoded with an application providing Virtual Local Area Network (VLAN) server redundancy, that when performed on the processor, provides a process for processing information, the process causing the first mobility switch to perform the operations of:

advertising, by a first mobility switch (MS) to at least one peer mobility switch, VLANs configured as server capable, said advertising including providing priority information relating to a server for said VLAN;

receiving advertising from said at least one peer mobility switch;

electing a server for a mobility VLAN which is not mapped locally;

maintaining a current server and a list of alternative servers for said VLAN; and determining when said first MS loses connection with said current server for said VLAN and moving said VLAN to an alternate server contained on said list.

10. The first mobility switch of claim 9 wherein said priority information includes at least one of administrator configured priority and dynamic priority.

11. The mobility switch of claim 10 wherein said dynamic priority is determined from a current capacity of said first MS and from port information associated with said first MS.

12. The first mobility switch of claim 9 wherein said electing is based on said priority information.

13. The first mobility switch of claim 9 further comprising performing load balancing when more than one server advertises for a VLAN.

14. The first mobility switch of claim 13 wherein a random weighted election method is used for performing said load balancing.

15. The first mobility switch of claim 14 wherein said random weighted election method includes a probability density function computed from said advertised priority.

16. The first mobility switch of claim 9 wherein said advertising is performed periodically.

17. A non-transitory computer readable storage medium having computer readable code thereon for providing Virtual Local Area Network (VLAN) server redundancy, the medium including instructions in which a computer system performs operations comprising:

advertising, by a first mobility switch (MS) to at least one peer mobility switch, VLANs configured as server capable, said advertising including providing priority information relating to a server for said VLAN;

receiving advertising from said at least one peer mobility switch;

electing a server for a mobility VLAN which is not mapped locally;

maintaining a current server and a list of alternative servers for said VLAN; and determining when said first MS loses connection with said current server for said VLAN and moving said VLAN to an alternate server contained on said list.

18. The computer readable storage of claim 17 wherein said priority information includes at least one
of administrator configured priority and dynamic priority, wherein said dynamic priority is determined from a current capacity of said first MS and from port information associated with said first MS.

19. The computer readable storage of claim 17 wherein said electing is based on said priority information.

20. The computer readable storage of claim 17 further comprising performing load balancing when more than one server advertises for a VLAN, wherein a random weighted election method is used for performing said load balancing, wherein said random weighted election method includes a probability density function computed from said advertised priority.

* * * * *